(12) United States Patent
Jiang

(10) Patent No.: US 10,965,167 B2
(45) Date of Patent: Mar. 30, 2021

(54) RF ENERGY HARVESTING SYSTEM

(71) Applicant: Fangxin Jiang, Hong Kong (HK)

(72) Inventor: Fangxin Jiang, Hong Kong (HK)

(73) Assignee: SHENZHEN DANSHA TECHNOLOGY CO., LTD., Guangdong (CN)

(*) Notice: Subject to any disclaimer, the term of this patent is extended or adjusted under 35 U.S.C. 154(b) by 103 days.

(21) Appl. No.: 16/445,222

(22) Filed: Jun. 19, 2019

(65) Prior Publication Data

US 2019/0305606 A1     Oct. 3, 2019

(51) Int. Cl.
*H01F 38/00* (2006.01)
*H02J 50/27* (2016.01)
*H02J 7/02* (2016.01)
*H02J 50/23* (2016.01)

(52) U.S. Cl.
CPC ............. *H02J 50/27* (2016.02); *H02J 7/025* (2013.01); *H02J 50/23* (2016.02)

(58) Field of Classification Search
CPC ..................................................... H02J 50/27
USPC ......................................................... 307/104
See application file for complete search history.

(56) References Cited

U.S. PATENT DOCUMENTS

2007/0087719 A1    4/2007  Mandal et al.
2011/0300798 A1    12/2011 Lefley
2018/0183274 A1    6/2018  Auten et al.

FOREIGN PATENT DOCUMENTS

CN     108306425 A    7/2018
GB       2479792 A   10/2011

*Primary Examiner* — Rexford N Barnie
*Assistant Examiner* — Dru Parries

(57) ABSTRACT

An RF energy harvesting system includes an antenna, an impedance matching network, an RF rectifier module, an enhanced RF rectifier module, a protection circuit, a power control module, an energy storage branch and load branches. The antenna receives RF signals and converts the RF signals into electric energy. The impedance matching network produces an initial voltage signal according to the electric energy output by the antenna. The RF rectifier module converts the initial voltage signal into a first voltage signal. The enhanced RF rectifier module converts the initial voltage signal into a second voltage signal. The power control module is self-driven through the first voltage signal and the second voltage signal. The RF rectifier module adjusts the internal electrical connection according to control signals of the power control module. The energy storage branch stores the electric energy output by the power control module.

15 Claims, 5 Drawing Sheets

RF ENERGY HARVESTING SYSTEM

FIELD OF THE PATENT APPLICATION

The present patent application generally relates to electronic technologies and more specifically to an RF energy harvesting system.

BACKGROUND

Converting energy harvested from the nature into electric energy without batteries or a wired power supply is one of the developmental directions of power supply technology. RF energy harvesting technology can provide flexible, portable and renewable energy resources and therefore has become a research hotspot of the public. Conventional RF energy harvesting systems typically include an antenna and an RF rectifier. The antenna is configured to receive RF signals and the rectifier is configured to convert the received RF energy into a DC power supply. However, the self-adaptability of such systems is not strong and the input energy is often not stable while the energy output of a system is often required to be as stable as possible and the output power is required to be high. Conventional RF energy harvesting systems often need to be equipped with an external power source and cannot be self-driven. At the same time, redundant energy harvested by conventional RF energy harvesting systems can only be stored outside the systems instead of being stored inside the systems, thus leading to inconvenience in operating and using such systems. On the other hand, the load of such systems often varies and the variation of load may influence the operation of such systems, and therefore does harm to the stability of such systems.

SUMMARY

The present patent application is directed to an RF energy harvesting system. In one aspect, the RF energy harvesting system includes an antenna configured to receive RF signals and convert energy of the RF signals to electric energy; an impedance matching network configured to optimize conversion efficiency of the electric energy so as to produce an initial voltage signal; an RF rectifier module configured to convert the initial voltage signal to a first voltage signal; an enhanced RF rectifier module configured to convert the initial voltage signal to a second voltage signal and voltage of the second voltage signal is greater than voltage of the first voltage signal; a power control module configured to power the power control module itself through receiving the first voltage signal and the second voltage signal; an energy storage branch and multiple load branches.

The power control module includes a rectification control unit and a load management unit. The rectification control unit is configured to transmit a control signal to the RF rectifier module according to an estimate of the first voltage signal under an open circuit condition so that the RF rectifier module adjusts electrical connections between multiple rectifiers in the RF rectifier module, thus varying the number of rectifiers connected in parallel in each rectifier unit and realizing maximum output of energy. Each rectifier unit includes one rectifier or at least two rectifiers connected in parallel with each other. Each rectifier includes an input port, an output port and a control port. The input port of each rectifier receives the initial voltage signal. Control ports of all rectifiers in a rectifier unit of a first stage are connected to the ground. Control ports of all rectifiers in each rectifier unit except the rectifier unit of the first stage are connected with output ports of all rectifiers in a neighboring rectifier unit of a previous stage. A total voltage output by output ports of all rectifiers in a rectifier unit of a last stage is an output voltage of the RF rectifier module.

The load management unit is configured to provide electric energy for the load branches and the energy storage branch and further configured to adjust duty ratio in real time so that the electric energy is transmitted to the load branches only when a voltage provided for the load branches meets requirements, so as to protect the load branches. The load management unit includes a first electronic switch, a second electronic switch, a third electronic switch, a first capacitor, a second capacitor and a resistor. The input port of the first electronic switch is connected with the RF rectifier module. The output port of the first electronic switch is connected to the ground through the first capacitor and connected to the ground through the second electronic switch and the second capacitor. The input port of the third electronic switch is connected with the RF rectifier module and the output port of the third electronic switch is connected to the ground through the resistor. The energy storage branch is configured to store electric energy output by the load management unit. The load branches are configured to be driven by the electric energy output by the load management unit.

The RF energy harvesting system may further include a protection circuit. The protection circuit may be connected with the RF rectifier module and the enhanced RF rectifier module and configured to prevent the second voltage signal from being too high so as to ensure stability of the RF energy harvesting system.

In another aspect, the present patent application provides an RF energy harvesting system. The RF energy harvesting system includes an antenna configured to receive RF signals and convert energy of the RF signals to electric energy; an impedance matching network configured to optimize conversion efficiency of the electric energy so as to produce an initial voltage signal; an RF rectifier module configured to convert the initial voltage signal to a first voltage signal; an enhanced RF rectifier module configured to convert the initial voltage signal to a second voltage signal and voltage of the second voltage signal is greater than voltage of the first voltage signal; a power control module configured to power the power control module itself through receiving the first voltage signal and the second voltage signal; an energy storage branch and multiple load branches. The power control module is configured to transmit a control signal to the RF rectifier module so that the RF rectifier module adjusts electrical connections between multiple rectifiers in the RF rectifier module, thus realizing maximum output of energy. The power control module is further configured to provide electric energy for the energy storage branch and the load branches. The energy storage branch is configured to store electric energy output by the power control module. The load branches are configured to be driven by the electric energy output by the power control module.

The multiple rectifiers in the RF rectifier module may be connected with one another through logic circuits so that multiple stages of rectifier units sequentially connected in series are formed. The RF rectifier module may vary the number of rectifiers connected in parallel in each rectifier unit according to the control signal.

When the initial voltage signal decreases, the RF rectifier module may reduce the number of rectifiers connected in parallel in each rectifier unit so that the number of stages of the rectifier units increases, thus ensuring that the first voltage signal remains constant. When the initial voltage signal increases, the RF rectifier module may increase the number of rectifiers connected in parallel in each rectifier unit, so that the number of stages of the rectifier units decreases, thus ensuring that the first voltage signal remains constant.

The rectifier unit may include one rectifier or at least two rectifiers connected in parallel with each other. The rectifier may include an input port, an output port and a control port. The input port of each rectifier may receive the initial voltage signal. Control ports of all rectifiers in a rectifier unit of a first stage may be connected to the ground. Control ports of all rectifiers in each rectifier unit except the rectifier unit of the first stage may be connected with output ports of all rectifiers in a neighboring rectifier unit of a previous stage. A total voltage output by output ports of all rectifiers in a rectifier unit of a last stage may be an output voltage of the RF rectifier module.

The power control module may include a rectification control unit and a load management unit. The rectification control unit may be configured to transmit the control signal to the RF rectifier module according to an estimate of the first voltage signal under an open circuit condition. The load management unit including a logic control circuit may be configured to provide electric energy for the load branches and the energy storage branch.

The load management unit may be further configured to adjust duty ratio in real time so that only when a voltage provided for the load branches meets requirements, the electric energy may be transmitted to the load branches so as to protect the load branches.

The load management unit may include a first electronic switch, a second electronic switch, a third electronic switch, a first capacitor, a second capacitor and a resistor. The input port of the first electronic switch may be connected with the RF rectifier module. The output port of the first electronic switch may be connected to the ground through the first capacitor and connected to the ground through the second electronic switch and the second capacitor. The input port of the third electronic switch may be connected with the RF rectifier module while the output port of the third electronic switch may be connected to the ground through the resistor.

The power control module may further include a clock generating unit and a reference voltage generating unit. The clock generating unit may be configured to produce clock signals for all digital circuits in the RF energy harvesting system. The reference voltage generating unit may be configured to produce reference voltage signals for all circuits in the RF energy harvesting system.

In yet another aspect, the present patent application provides an RF energy harvesting system. The RF energy harvesting system includes an antenna configured to receive RF signals and convert energy of the RF signals to electric energy; an impedance matching network configured to optimize conversion efficiency of the electric energy so as to produce an initial voltage signal; an RF rectifier module configured to convert the initial voltage signal to a first voltage signal; an enhanced RF rectifier module configured to convert the initial voltage signal to a second voltage signal and voltage of the second voltage signal is greater than voltage of the first voltage signal; a power control module configured to power the power control module itself through receiving the first voltage signal and the second voltage signal; an energy storage branch and multiple load branches. The power control module includes a rectification control unit and a load management unit. The rectification control unit is configured to transmit a control signal to the RF rectifier module according to an estimate of the first voltage signal under an open circuit condition so that the RF rectifier module adjusts electrical connections between multiple rectifiers in the RF rectifier module, thus varying the number of rectifiers connected in parallel in each rectifier unit and realizing maximum output of energy. The load management unit is configured to provide electric energy for the load branches and the energy storage branch. The energy storage branch is configured to store electric energy output by the load management unit. The load branches are configured to be driven by the electric energy output by the load management unit.

Each rectifier unit may include one rectifier or at least two rectifiers connected in parallel with each other. Each rectifier may include an input port, an output port and a control port. The input port of each rectifier may receive the initial voltage signal. Control ports of all rectifiers in a rectifier unit of a first stage may be connected to the ground. Control ports of all rectifiers in each rectifier unit except the rectifier unit of the first stage may be connected with output ports of all rectifiers in a neighboring rectifier unit of a previous stage. A total voltage output by output ports of all rectifiers in a rectifier unit of a last stage may be an output voltage of the RF rectifier module.

The load management unit may include a first electronic switch, a second electronic switch, a third electronic switch, a first capacitor, a second capacitor and a resistor. The input port of the first electronic switch may be connected with the RF rectifier module. The output port of the first electronic switch may be connected to the ground through the first capacitor and connected to the ground through the second electronic switch and the second capacitor. The input port of the third electronic switch may be connected with the RF rectifier module and the output port of the third electronic switch may be connected to the ground through the resistor.

The RF energy harvesting system may further include a protection circuit. The protection circuit may be connected with the RF rectifier module and the enhanced RF rectifier module and configured to prevent the second voltage signal from being too high so as to ensure stability of the RF energy harvesting system.

The multiple rectifiers in the RF rectifier module may be connected with one another through logic circuits so that multiple stages of rectifier units sequentially connected in series are formed. The RF rectifier module may vary the number of rectifiers connected in parallel in each rectifier unit according to the control signal.

When the initial voltage signal decreases, the RF rectifier module may reduce the number of rectifiers connected in parallel in each rectifier unit so that the number of stages of the rectifier units increases, thus ensuring that the first voltage signal remains constant. When the initial voltage signal increases, the RF rectifier module may increase the number of rectifiers connected in parallel in each rectifier unit, so that the number of stages of the rectifier units decreases, thus ensuring that the first voltage signal remains constant.

The load management unit may be further configured to adjust duty ratio in real time so that the electric energy may be transmitted to the load branches only when a voltage provided for the load branches meets requirements, so as to protect the load branches.

The power control module may further include a clock generating unit and a reference voltage generating unit. The clock generating unit may be configured to produce clock signals for all digital circuits in the RF energy harvesting system. The reference voltage generating unit may be configured to produce reference voltage signals for all circuits in the RF energy harvesting system.

DETAILED DESCRIPTION

Reference will now be made in detail to a preferred embodiment of the RF energy harvesting system disclosed in the present patent application, examples of which are also provided in the following description. Exemplary embodiments of the RF energy harvesting system disclosed in the present patent application are described in detail, although it will be apparent to those skilled in the relevant art that some features that are not particularly important to an understanding of the RF energy harvesting system may not be shown for the sake of clarity.

Furthermore, it should be understood that the RF energy harvesting system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
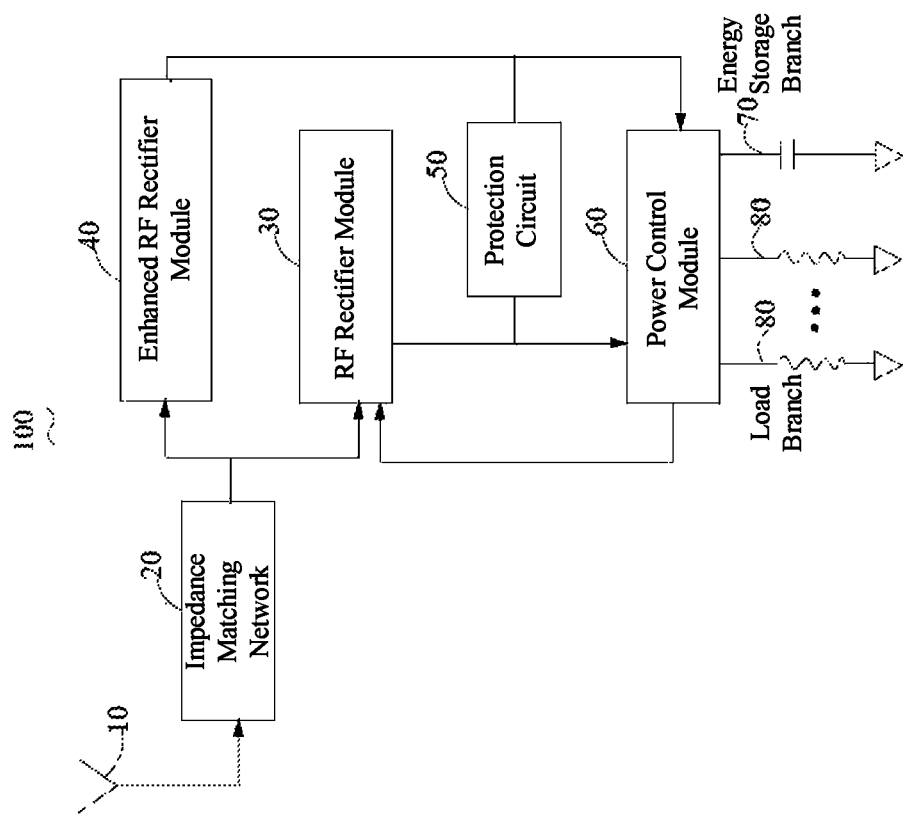
FIG. 1 is a block diagram of an RF energy harvesting system in accordance with an embodiment of the present patent application.

FIG. 1 is a block diagram of an RF energy harvesting system in accordance with an embodiment of the present patent application. Referring to FIG. 1, the RF energy harvesting system 100 includes an antenna 10, an impedance matching network 20, an RF rectifier module 30, an enhanced RF rectifier module 40, a protection circuit 50, a power control module 60, an energy storage branch 70 and load branches 80.

The antenna 10 is configured to receive RF signals and convert RF energy into electric energy. In this embodiment, the antenna 10 is configured to receive the RF signals with a frequency of 950 to 1050 MHZ.

The impedance matching network 20 is configured to optimize the conversion efficiency of the electric energy so as to produce an initial voltage signal V0.

The RF rectifier module 30 is configured to convert the initial voltage signal V0 from an AC signal to a DC signal so as to produce a first voltage signal V1. The RF rectifier module 30 is further configured to automatically adjust the electrical connections between multiple rectifiers 31 in the RF rectifier module 30 according to the input power (i.e. control signals transmitted by the power control module 60) so as to optimize the overall output efficiency of the RF energy harvesting system 100 and realize the maximum output of energy.

Figure 2:
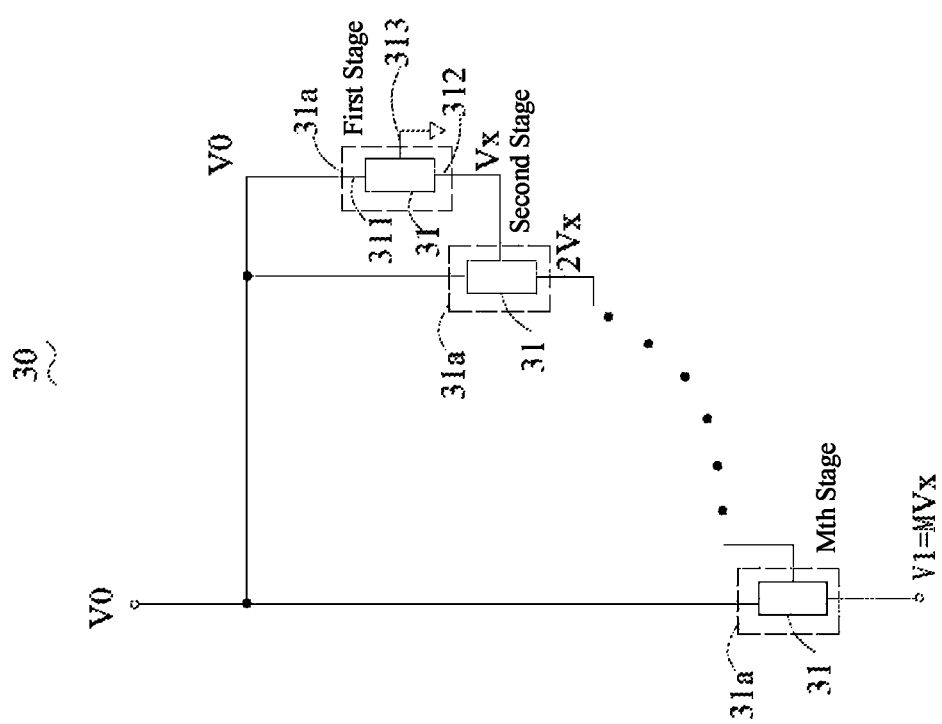
FIG. 2 is a schematic circuit diagram of one embodiment of an RF rectifier module of the RF energy harvesting system as depicted in FIG. 1.
Figure 3:
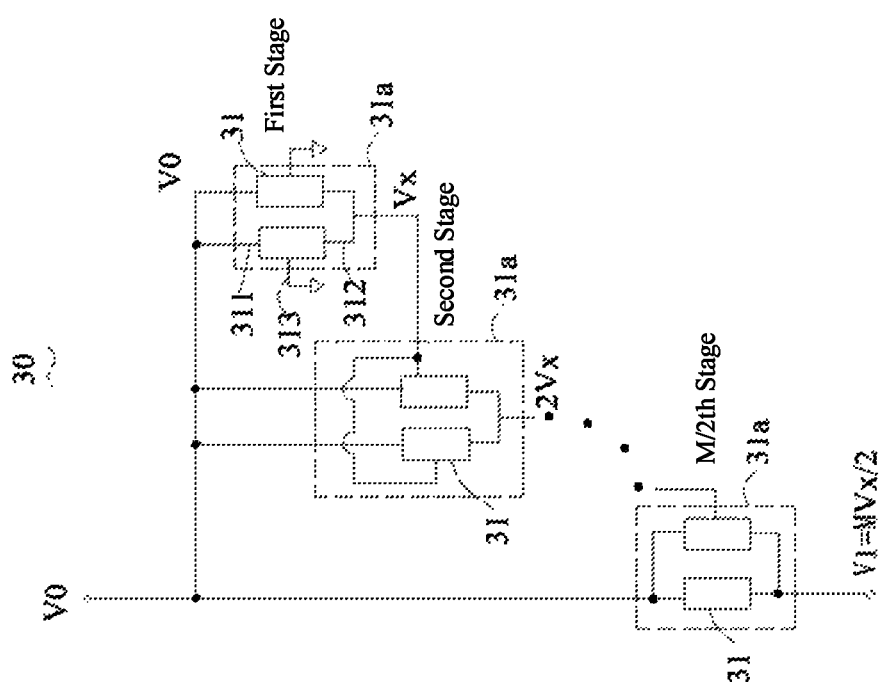
FIG. 3 is a schematic circuit diagram of one embodiment of an RF rectifier module of the RF energy harvesting system as depicted in FIG. 1.

Referring to FIG. 2 and FIG. 3, the multiple rectifiers 31 in the RF rectifier module 30 are connected with one another through logic circuits (e.g. AND gate, NOT gate, OR gate, etc.) so that the electrical connections between the multiple rectifiers 31 is varied according to the real-time variation of the input energy. As a result, multiple stages of rectifier units 31a sequentially connected in series are formed and the number of rectifiers 31 connected in parallel in each rectifier unit 31a can be varied so as to realize the maximum output of energy and stabilize the output power.

The rectifier unit 31a includes one rectifier 31 or at least two rectifiers 31 connected in parallel with each other. The rectifier 31 includes an input port 311, an output port 312 and a control port 313. The input port 311 of each rectifier 31 receives the initial voltage signal V0. Control ports 313 of all rectifiers 31 in a rectifier unit 31a of a first stage are connected to the ground. Control ports 313 of all rectifiers 31 in each rectifier unit 31a except the rectifier unit 31a of the first stage are connected with output ports 312 of all rectifiers 31 in a neighboring rectifier unit 31a of a previous stage. A total voltage output by output ports 313 of all rectifiers 31 in a rectifier unit 31a of a last stage is an output voltage of the RF rectifier module 30. In this embodiment, the structures of the multiple rectifier units 31a are identical. Of course, in other embodiments, the structures of the multiple rectifier units 31a may be different.

Referring to FIG. 2, when the initial voltage signal V0 decreases, the RF rectifier module 30 reduces the number of rectifiers 31 connected in parallel in each rectifier unit 31a so that the number of stages of the rectifier units 31a increases, thus ensuring that the first voltage signal V1 may not decrease with the decrease of the initial voltage signal V0 and remains constant all the time so as to increase the maximum output power. Specifically, for example, each rectifier unit 31a includes one rectifier 31. If the number of the rectifiers 31 is M, rectifier units 31a of M stages are formed. Each rectifier unit 31a is configured to convert the initial voltage signal V0 to a voltage Vx+V0, then an output voltage of the rectifier unit 31a of the first stage is Vx+V0, an output voltage of the rectifier unit 31a of the second stage is 2Vx+V0, and the like, an output voltage of the rectifier unit 31a of the Mth stage is MVx+V0, and therefore the output voltage V1 of the RF rectifier module 30 is MVx+V0.

Referring to FIG. 3, when the initial voltage signal V0 increases, the RF rectifier module 30 increases the number of rectifiers 31 connected in parallel in each rectifier unit 31a, so that the number of stages of the rectifier units 31a decreases, thus ensuring that the first voltage signal V1 remains constant and the output current increases so as to increase the maximum output power. Specifically, at this time, each rectifier unit 31a includes at least two rectifiers 31 connected in parallel with each other. In this embodiment, each rectifier unit 31a includes two rectifiers 31 connected in parallel with each other. If the number of the rectifiers 31 is M, rectifier units 31a of M/2 stages are formed. Of course, the number of rectifiers 31 in each rectifier unit 31a is not limited to this embodiment. Each rectifier unit 31a is configured to convert the initial voltage signal V0 to a voltage Vx+V0, then an output voltage of the rectifier unit 31a of the first stage is Vx+V0, an output voltage of the rectifier unit 31a of the second stage is 2Vx+V0 and the like, an output voltage of the rectifier unit 31a of the M/2th stage is MVx/2+V0, and therefore an output voltage V1 of the RF rectifier module 30 is MVx/2+V0.

The enhanced RF rectifier module 40 is configured to convert the initial voltage signal V0 from an AC signal to a DC signal so as to produce a second voltage signal V2 and the voltage of the second voltage signal V2 is greater than the voltage of the first voltage signal V1.

The protection circuit 50 is connected with the RF rectifier module 30 and the enhanced RF rectifier module 40 and configured to prevent the second voltage signal V2 from being too high so as to ensure the stability of the RF energy harvesting system 100.

The power control module 60 is configured to power the power control module 60 itself through receiving the first voltage signal V1 and the second voltage signal V2 so as to realize self-driving of the RF energy harvesting system 100 without an external power supply.

Figure 4:
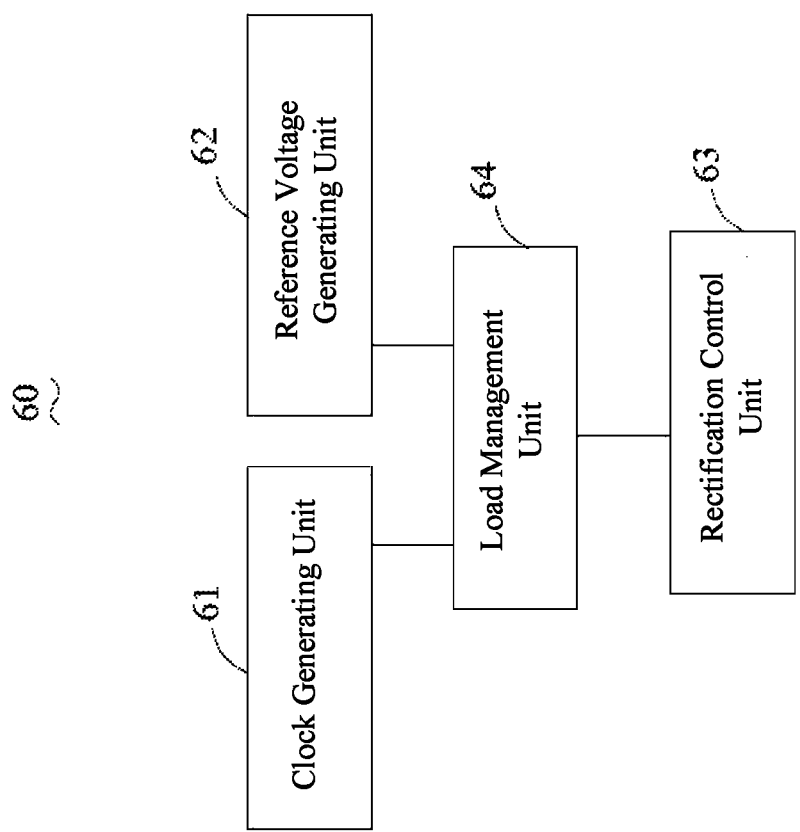
FIG. 4 is a block diagram of a power control module of the RF energy harvesting system as depicted in FIG. 1.

The power control module 60 is further configured to provide clock signals and reference voltage signals for the RF energy harvesting system 100, provide control signals for the RF rectifier module 30 and provide electric energy for the energy storage branch 70 and the load branches 80. Referring to FIG. 4, the power control module 60 includes a clock generating unit 61, a reference voltage generating unit 62, a rectification control unit 63 and a load management unit 64.

The clock generating unit 61 is configured to produce the clock signals for all digital circuits in the RF energy harvesting system 100.

The reference voltage generating unit 62 is configured to produce the reference voltage signals for all circuits in the RF energy harvesting system 100. The reference voltage signals vary little with temperature and processing while remaining essentially constant.

The rectification control unit 63 is configured to transmit the control signals to the RF rectifier module 30 according to an estimate of the first voltage signal V1 under an open circuit condition so that the RF rectifier module 30 can configure the electrical connections between the multiple rectifiers 31 in the RF rectifier module 30 according to the control signals.

Figure 5:
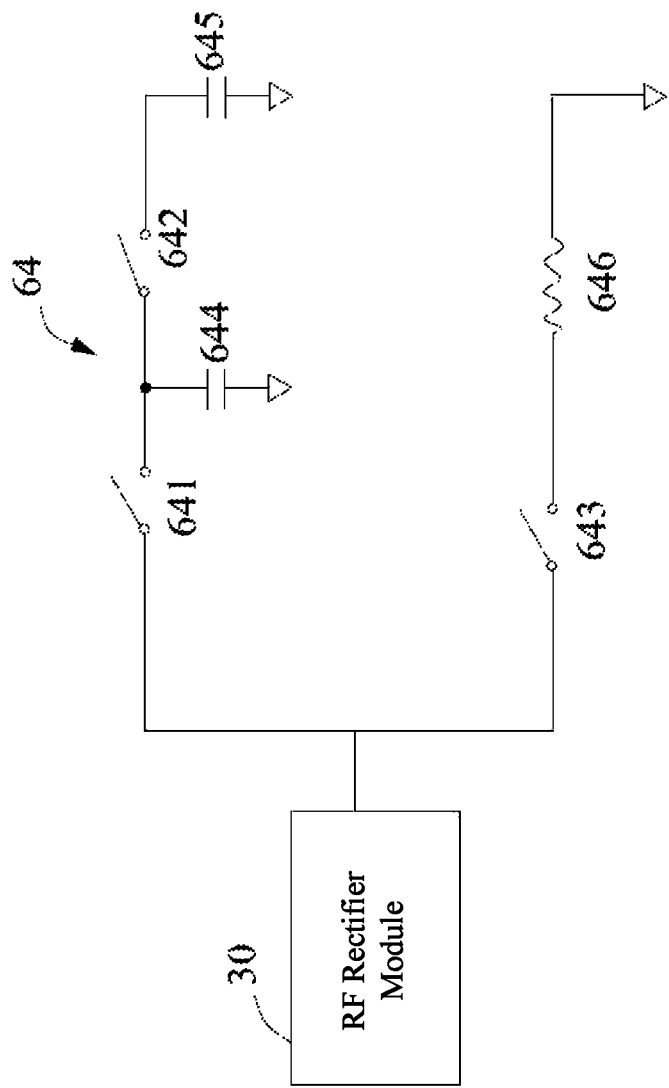
FIG. 5 is a block diagram of a load management unit of the power control module as depicted in FIG. 4.

The load management unit 64 including a logic control circuit is configured to provide electric energy for the energy storage branch 70 and the load branches 80. The load management unit 64 is further configured to adjust the duty ratio in real time so that the electric energy is transmitted to the load branches 80 only when the voltage provided for the load branches 80 meets requirements, thus realizing the protection of the load branches 80. At the same time, the redundant energy is stored in a capacitor for energy storage. In addition, the load management unit 64 can adjust the energy output in real time according to the variation of the load branches 80 so as to realize real-time load management and improve the system's capability of adapting to different application scenarios. Referring to FIG. 5, the load management unit 64 includes a first electronic switch 641, a second electronic switch 642, a third electronic switch 643, a first capacitor 644, a second capacitor 645 and a resistor 646.

The input port of the first electronic switch 641 is connected with the RF rectifier module 30. The output port of the first electronic switch 641 is connected to the ground through the first capacitor 644 and connected to the ground through the second electronic switch 642 and the second capacitor 645. The input port of the third electronic switch 643 is connected with the RF rectifier module 30 while the output port of the third electronic switch 643 is connected to the ground through the resistor 646. The internal resistance of the RF rectifier module 30 is R0 and the resistance of the resistor 646 is R1.

The operating process of the load management unit 64 is as follows: when energy from the RF rectifier module 30 is less than the requirements of the load branches 80, R0>R1 and adjusting the third electronic switch 643 so as to lower the duty ratio; when energy from the RF rectifier module 30 is greater than the requirements of the load branches 80, R0<R1 and adjusting the third electronic switch 643 so as to increase the duty ratio, so that in the former half of a cycle, the first electronic switch 641 is closed, the second electronic switch 642 is open and the RF rectifier module 30 charges the first capacitor 644 while in the latter half of the cycle, the first electronic switch 641 is open, the second electronic switch 642 is closed and the first capacitor 644 charges the second capacitor 645.

The energy storage branch 70 is configured to store the electric energy output by the power control module 60.

The load branches 80 are configured to be driven by the electric energy output by the power control module 60.

Compared with the conventional RF energy harvesting systems, in the RF energy harvesting system 100 of the present patent application, the RF rectifier module 30 can vary the number of rectifiers 31 connected in parallel in each rectifier unit 31a according to the real-time variation of input energy so as to realize the maximum output of energy and stable output power and strong self-adaptability. Since the first voltage signal produced by the RF rectifier module 30 and the second voltage signal produced by the enhanced RF rectifier module 40 can power the power control module 60 directly, the RF energy harvesting system can be self-driven without an external power supply. Since the load management unit 64 can not only control and store the redundant energy, but also adjust the energy output in real time according to the variation of the load branches, the RF energy harvesting system is convenient to operate with strong stability and can be applied to a wide range of application scenarios. At the same time, since all modules in the RF energy harvesting system 100 are integrated on a chip, the integration of the RF energy harvesting system 100 is high and therefore the cost is further lowered.

While the present patent application has been shown and described with particular references to a number of embodiments thereof, it should be noted that various other changes or modifications may be made without departing from the scope of the present invention.

What is claimed is:

1. An RF energy harvesting system comprising:
an antenna configured to receive RF signals and convert energy of the RF signals to electric energy;
an impedance matching network configured to optimize conversion efficiency of the electric energy so as to produce an initial voltage signal;
an RF rectifier module configured to convert the initial voltage signal to a first voltage signal;
an enhanced RF rectifier module configured to convert the initial voltage signal to a second voltage signal and voltage of the second voltage signal is greater than voltage of the first voltage signal;
a power control module configured to power the power control module itself through receiving the first voltage signal and the second voltage signal;
an energy storage branch; and
a plurality of load branches; wherein:
the power control module comprises a rectification control unit and a load management unit; the RF rectifier module comprises a plurality of rectifier units, while each rectifier unit comprises one rectifier or at least two rectifiers connected in parallel with each other; the rectification control unit is configured to transmit a control signal to the RF rectifier module according to an estimate of the first voltage signal under an open circuit condition so that the RF rectifier module adjusts electrical connections between the plurality of rectifiers in the RF rectifier module, thus varying the number of rectifiers connected in parallel in each rectifier unit and realizing maximum output of energy;

each rectifier comprises an input port, an output port and a control port;

the input port of each rectifier receives the initial voltage signal;

control ports of all rectifiers in a rectifier unit of a first stage are connected to the ground;

control ports of all rectifiers in each rectifier unit except the rectifier unit of the first stage are connected with output ports of all rectifiers in a neighboring rectifier unit of a previous stage;

a total voltage output by output ports of all rectifiers in a rectifier unit of a last stage is an output voltage of the RF rectifier module;

the load management unit is configured to provide electric energy for the load branches and the energy storage branch and further configured to adjust duty ratio in real time so that the electric energy is transmitted to the load branches only when a voltage provided for the load branches meets requirements, so as to protect the load branches;

the load management unit comprises a first electronic switch, a second electronic switch, a third electronic switch, a first capacitor, a second capacitor and a resistor;

the input port of the first electronic switch is connected with the RF rectifier module;

the output port of the first electronic switch is connected to the ground through the first capacitor and connected to the ground through the second electronic switch and the second capacitor;

the input port of the third electronic switch is connected with the RF rectifier module and the output port of the third electronic switch is connected to the ground through the resistor;

the energy storage branch is configured to store electric energy output by the load management unit; and the load branches are configured to be driven by the electric energy output by the load management unit.

2. The RF energy harvesting system of claim 1 further comprising a protection circuit, wherein the protection circuit is connected with the RF rectifier module and the enhanced RF rectifier module and configured to prevent the second voltage signal from being too high so as to ensure stability of the RF energy harvesting system.

3. An RF energy harvesting system comprising:
an antenna configured to receive RF signals and convert energy of the RF signals to electric energy;
an impedance matching network configured to optimize conversion efficiency of the electric energy so as to produce an initial voltage signal;
an RF rectifier module configured to convert the initial voltage signal to a first voltage signal;
an enhanced RF rectifier module configured to convert the initial voltage signal to a second voltage signal and voltage of the second voltage 5 signal is greater than voltage of the first voltage signal;
a power control module configured to power the power control module itself through receiving the first voltage signal and the second voltage signal;
an energy storage branch; and
a plurality of load branches; wherein:
the power control module is configured to transmit a control signal to the RF rectifier module so that the RF rectifier module adjusts electrical connections between a plurality of rectifiers in the RF rectifier module, thus realizing maximum output of energy;
the power control module is further configured to provide electric energy for the energy storage branch and the load branches;
the energy storage branch is configured to store electric energy output by the power control module; and
the load branches are configured to be driven by the electric energy output by the power control module;
wherein the power control module comprises a rectification control unit and a load management unit; the rectification control unit is configured to transmit the control signal to the RF rectifier module according to an estimate of the first voltage signal under an open circuit condition; the load management unit comprising a logic control circuit is configured to provide electric energy for the load branches and the energy storage branch;
wherein the load management unit is further configured to adjust duty ratio in real time so that only when a voltage provided for the load branches meets requirements, the electric energy is transmitted to the load branches so as to protect the load branches; and
wherein the load management unit comprises a first electronic switch, a second electronic switch, a third electronic switch, a first capacitor, a second capacitor and a resistor; the input port of the first electronic switch is connected with the RF rectifier module; the output port of the first electronic switch is connected to the ground through the first capacitor and connected to the ground through the second electronic switch and the second capacitor; the input port of the third electronic switch is connected with the RF rectifier module while the output port of the third electronic switch is connected to the ground through the resistor.

4. The RF energy harvesting system of claim 3, wherein the plurality of rectifiers in the RF rectifier module are connected with one another through logic circuits so that multiple stages of rectifier units sequentially connected in series are formed; the RF rectifier module can vary the number of rectifiers connected in parallel in each rectifier unit according to the control signal.

5. The RF energy harvesting system of claim 4, wherein when the initial voltage signal decreases, the RF rectifier module reduces the number of rectifiers connected in parallel in each rectifier unit so that the number of stages of the rectifier units increases, thus ensuring that the first voltage signal remains constant; when the initial voltage signal increases, the RF rectifier module increases the number of rectifiers connected in parallel in each rectifier unit, so that the number of stages of the rectifier units decreases, thus ensuring that the first voltage signal remains constant.

6. The RF energy harvesting system of claim 4, wherein the rectifier unit comprises one rectifier or at least two rectifiers connected in parallel with each other; the rectifier comprises an input port, an output port and a control port; the input port of each rectifier receives the initial voltage signal; control ports of all rectifiers in a rectifier unit of a first stage are connected to the ground; control ports of all rectifiers in each rectifier unit except the rectifier unit of the first stage are connected with output ports of all rectifiers in a neighboring rectifier unit of a previous stage; a total voltage output by output ports of all rectifiers in a rectifier unit of a last stage is an output voltage of the RF rectifier module.

7. The RF energy harvesting system of claim 3, wherein the power control module further comprises a clock generating unit and a reference voltage generating unit; the clock generating unit is configured to produce clock signals for all digital circuits in the RF energy harvesting system; the reference voltage generating unit is configured to produce reference voltage signals for all circuits in the RF energy harvesting system.

8. An RF energy harvesting system comprising:
an antenna configured to receive RF signals and convert energy of the RF signals to electric energy;
an impedance matching network configured to optimize conversion efficiency of the electric energy so as to produce an initial voltage signal;
an RF rectifier module configured to convert the initial voltage signal to a first voltage signal;
an enhanced RF rectifier module configured to convert the initial voltage signal to a second voltage signal and voltage of the second voltage signal is greater than voltage of the first voltage signal;
a power control module configured to power the power control module itself through receiving the first voltage signal and the second voltage signal;
an energy storage branch; and
a plurality of load branches; wherein:
the power control module comprises a rectification control unit and a load management unit;
the RF rectifier module comprises a plurality of rectifier units, while each rectifier unit comprises one rectifier or at least two rectifiers connected in parallel with each other;
the rectification control unit is configured to transmit a control signal to the RF rectifier module according to an estimate of the first voltage signal under an open circuit condition so that the RF rectifier module adjusts electrical connections between a plurality of rectifiers in the RF rectifier module, thus varying the number of rectifiers connected in parallel in each rectifier unit and realizing maximum output of energy;
the load management unit is configured to provide electric energy for the load branches and the energy storage branch;
the energy storage branch is configured to store electric energy output by the load management unit; and
the load branches are configured to be driven by the electric energy output by the load management unit;
wherein the load management unit comprises a first electronic switch, a second electronic switch, a third electronic switch, a first capacitor, a second capacitor and a resistor; the input port of the first electronic switch is connected with the RF rectifier module; the output port of the first electronic switch is connected to the ground through the first capacitor and connected to the ground through the second electronic switch and the second capacitor; the input port of the third electronic switch is connected with the RF rectifier module and the output port of the third electronic switch is connected to the ground through the resistor.

9. The RF energy harvesting system of claim 8, wherein each rectifier comprises an input port, an output port and a control port; the input port of each rectifier receives the initial voltage signal; control ports of all rectifiers in a rectifier unit of a first stage are connected to the ground; control ports of all rectifiers in each rectifier unit except the rectifier unit of the first stage are connected with output ports of all rectifiers in a neighboring rectifier unit of a previous stage; a total voltage output by output ports of all rectifiers in a rectifier unit of a last stage is an output voltage of the RF rectifier module.

10. The RF energy harvesting system of claim 8 further comprising a protection circuit, wherein the protection circuit is connected with the RF rectifier module and the enhanced RF rectifier module and configured to prevent the second voltage signal from being too high so as to ensure stability of the RF energy harvesting system.

11. The RF energy harvesting system of claim 10, wherein the plurality of rectifiers in the RF rectifier module are connected with one another through logic circuits so that multiple stages of rectifier units sequentially connected in series are formed; the RF rectifier module can vary the number of rectifiers connected in parallel in each rectifier unit according to the control signal.

12. The RF energy harvesting system of claim 11, wherein when the initial voltage signal decreases, the RF rectifier module reduces the number of rectifiers connected in parallel in each rectifier unit so that the number of stages of the rectifier units increases, thus ensuring that the first voltage signal remains constant.

13. The RF energy harvesting system of claim 12, wherein when the initial voltage signal increases, the RF rectifier module increases the number of rectifiers connected in parallel in each rectifier unit, so that the number of stages of the rectifier units decreases, thus ensuring that the first voltage signal remains constant.

14. The RF energy harvesting system of claim 13, wherein the load management unit is further configured to adjust duty ratio in real time so that the electric energy is transmitted to the load branches only when a voltage provided for the load branches meets requirements, so as to protect the load branches.

15. The RF energy harvesting system of claim 14, wherein the power control module further comprises a clock generating unit and a reference voltage generating unit; the clock generating unit is configured to produce clock signals for all digital circuits in the RF energy harvesting system; the reference voltage generating unit is configured to produce reference voltage signals for all circuits in the RF energy harvesting system.

* * * * *